United States Patent
Li (10) Patent No.: US 6,676,492 B2
(45) Date of Patent: Jan. 13, 2004

(54) CHEMICAL MECHANICAL POLISHING

(76) Inventor: Chou H. Li, 1 Oak Bend Rd., W. Orange, NJ (US) 07052

(*) Notice: Subject to any disclaimer, the term of this patent is extended or adjusted under 35 U.S.C. 154(b) by 0 days.

(21) Appl. No.: 10/146,137

(22) Filed: May 16, 2002

(65) Prior Publication Data

US 2002/0173252 A1 Nov. 21, 2002

Related U.S. Application Data

(63) Continuation-in-part of application No. 09/391,596, filed on Sep. 8, 1999.
(60) Provisional application No. 60/112,182, filed on Dec. 15, 1998.

(51) Int. Cl.$^7$ ............................................... B24B 7/00
(52) U.S. Cl. ........................ 451/65; 451/288; 451/285; 451/57
(58) Field of Search ............................ 451/65, 339, 41, 451/60, 28, 285, 288, 446, 57, 527, 529, 533, 539

(56) References Cited

U.S. PATENT DOCUMENTS

| | | | |
|---|---|---|---|
| 2,163,407 A | 6/1939 | Pulfrich .......................... 18/59 |
| 2,570,248 A | 10/1951 | Kelley .......................... 29/179.5 |
| 2,667,432 A | 2/1954 | Nolte .......................... 117/123 |
| 2,708,787 A | 5/1955 | Chick et al. .................. 29/473.1 |
| 3,215,555 A | 11/1965 | Krey .......................... 117/123 |
| 3,281,309 A | 10/1966 | Ross .......................... 161/196 |
| 3,428,846 A | 2/1969 | Rigden et al. .............. 313/284 |
| 3,448,319 A | 6/1969 | Louden ....................... 313/221 |
| 3,452,310 A | 6/1969 | Israelson ..................... 335/286 |
| 3,574,579 A | 4/1971 | Clarke ......................... 51/307 |
| 3,650,714 A | 3/1972 | Farkas ......................... 51/295 |
| 3,740,822 A | 6/1973 | Singleton ..................... 29/419 |
| 3,753,758 A | 8/1973 | Shanley ....................... 117/25 |
| 3,777,220 A | 12/1973 | Tatusko et al. ............. 317/101 A |
| 3,901,772 A | 8/1975 | Guillotin et al. ............. 204/16 |
| 3,915,369 A | 10/1975 | Schmidt-Bruecken et al. .......................... 228/194 |
| 3,949,263 A | 4/1976 | Harper ....................... 315/3.5 |
| 4,009,027 A | 2/1977 | Naidich et al. .............. 75/154 |
| 4,018,576 A | 4/1977 | Lowder et al. .............. 51/309 |
| 4,075,364 A | 2/1978 | Panzera ...................... 427/34 |

(List continued on next page.)

OTHER PUBLICATIONS

U.S. Patent Application Ser. No. 08,/482,199, Li filed Jun. 8, 1995.
U.S. Patent Application Ser. No. 09/053,741, Li filed Apr. 2, 1999.
U.S. Patent Application Ser. No. 09/361,209, Li et al., filed Jul. 27, 1999.
U.S. Patent Application Ser. No. 09/334,565, Li filed Jun. 21, 1999.
U.S. Patent Application Ser. No. 09/461,405, Li et al., filed Dec. 15, 1999.

Primary Examiner—Lee D. Wilson
(74) Attorney, Agent, or Firm—James A. Poulos, III (57) ABSTRACT

A planatizing equipment has solid abrasive particles suspended in a liquid suspension. The solid abrasive particles have on their outer surfaces tiny, hard but brittle working edges and points. The liquid suspension medium and the solid abrasive particles have nearly the same density to prevent the brittle working edges and paints from sufficiently contacting and damaging each other. This significantly lengthens the useful life of the solid abrasive particles.

25 Claims, 2 Drawing Sheets

U.S. PATENT DOCUMENTS

| | | | |
|---|---|---|---|
| 4,109,031 A | 8/1978 | Marscher | 427/191 |
| 4,111,572 A | 9/1978 | Noone et al. | 403/28 |
| 4,239,502 A | 12/1980 | Slack et al. | 51/295 |
| 4,252,856 A | 2/1981 | Sara | 428/408 |
| 4,294,009 A | 10/1981 | Quintin et al. | 29/832 |
| 4,338,380 A | 7/1982 | Erickson et al. | 428/594 |
| 4,347,089 A | 8/1982 | Loehman | 156/89 |
| 4,348,131 A | 9/1982 | Shimanuki et al. | 403/272 |
| 4,372,037 A | 2/1983 | Scapple et al. | 29/613 |
| 4,396,677 A | 8/1983 | Intrater et al. | 428/408 |
| 4,404,262 A | 9/1983 | Watmough | 428/539 |
| 4,529,836 A | 7/1985 | Powers et al. | 174/94 |
| 4,529,857 A | 7/1985 | Meek et al. | 219/10.55 M |
| 4,556,389 A | 12/1985 | Ueno et al. | 433/206 |
| 4,593,851 A | 6/1986 | Skog | 228/248 |
| 4,608,226 A | 8/1986 | Lauvinerie et al. | 419/5 |
| 4,624,403 A | 11/1986 | Kohno et al. | 228/122 |
| 4,703,884 A | 11/1987 | Landingham et al. | 228/122 |
| 4,732,780 A | 3/1988 | Mitoff et al. | 427/125 |
| 4,735,866 A | 4/1988 | Moorhead | 428/627 |
| 4,750,914 A | 6/1988 | Chikaoka et al. | 51/293 |
| 4,776,862 A | 10/1988 | Wiand | 51/293 |
| 4,851,615 A | 7/1989 | Butt | 174/68.5 |
| 4,890,783 A | 1/1990 | Li | 228/122 |
| 4,899,922 A | 2/1990 | Slutz et al. | 228/121 |
| 4,924,033 A | 5/1990 | Iyogi et al. | 174/259 |
| 4,953,499 A | 9/1990 | Anthony et al. | 118/724 |
| 4,958,592 A | 9/1990 | Anthony et al. | 118/724 |
| 4,968,326 A | 11/1990 | Wiand et al. | 51/293 |
| 4,970,986 A | 11/1990 | Anthony et al. | 118/724 |
| 5,022,801 A | 6/1991 | Anthony et al. | 408/144 |
| 5,110,579 A | 5/1992 | Anthony et al. | 423/446 |
| 5,116,787 A | 5/1992 | Dumbaugh, Jr. | 501/66 |
| 5,125,557 A | 6/1992 | Tanaka et al. | 228/121 |
| 5,143,523 A | 9/1992 | Matarrese | 51/293 |
| 5,161,728 A | 11/1992 | Li | 228/124 |
| 5,190,823 A | 3/1993 | Anthony et al. | 428/408 |
| 5,230,924 A | 7/1993 | Li | 427/229 |
| 5,248,079 A | 9/1993 | Li | 228/121 |
| 5,273,731 A | 12/1993 | Anthony et al. | 423/446 |
| 5,349,922 A | 9/1994 | Anthony et al. | 117/204 |
| 5,377,522 A | 1/1995 | Anthony et al. | 72/467 |
| 5,392,982 A | 2/1995 | Li | 228/124.5 |
| 5,419,276 A | 5/1995 | Anthony et al. | 117/86 |
| 5,419,798 A | 5/1995 | Anthony et al. | 156/345 |
| 5,424,096 A | 6/1995 | Anthony et al. | 427/249 |
| 5,451,430 A | 9/1995 | Anthony et al. | 427/122 |
| 5,464,665 A | 11/1995 | Anthony et al. | 427/570 |
| 5,481,795 A | 1/1996 | Hatakeyama et al. | 29/852 |
| 5,551,277 A | 9/1996 | Anthony et al. | 72/467 |
| 5,573,607 A | 11/1996 | Weaver | 148/437 |
| 5,573,985 A | 11/1996 | Weaver | 501/96 |
| 5,582,540 A * | 12/1996 | Su et al. | 451/60 |
| 5,755,614 A * | 5/1998 | Adams et al. | 451/60 |
| 5,874,175 A * | 2/1999 | Li | 428/457 |
| 5,932,348 A | 8/1999 | Li | 428/402 |
| 5,937,514 A | 8/1999 | Li | 29/840 |
| 6,139,406 A * | 10/2000 | Kennedy et al. | 451/67 |
| 6,286,206 B1 | 9/2001 | Li | 29/840 |
| 6,458,017 B1 * | 10/2002 | Li et al. | 451/28 |

* cited by examiner

CHEMICAL MECHANICAL POLISHING

REFERENCE TO RELATED APPLICATIONS

This is a continuation-in-part (CIP) of pending and allowed U.S. application Ser. No. 09/391,596, filed Sep. 8, 1999, which is a CIP of Ser No. 60/112,182 filed Dec. 15, 1998. These applications are hereby incorporated by reference.

BACKGROUND OF THE INVENTION

1. Field

This invention relates to chemical mechanical polishing, and more particularly to improved chemical mechanical polishing with improved reproducibility, versatility, productivity, robustness, and low cost.

2. Prior Art

CMP is uniquely capable of removing thick metal films while leaving intact features inset and surrounding dielectric films. This process has become an enabling technology for both advanced tungsten plug and copper demanscence process. It is as crucial as metal deposition or lithography aiming to achieve global planarity. CMP is no longer a niche application with the same fixed equipment, material, and process for all various device designs, material and process selections. In particular, device miniaturization and the coming of multi-metal architectures and techniques such as the emerging copper dual damascene are seriously challenging. These challenges force CMP technology including platforms, chemistries, pads and slurries to rapidly and radically evolve and improve.

Current CMP is not perfect. It must be carefully controlled for it to be optimized. A poorly executed CMP can generate extreme metal dishing in wide structures or dielectric erosion in high-density regions of smaller features. Abrasive particle containing slurries generate scratches or gouges in the inlaid structures. If a substrate is improperly post-CMP cleaned, the slurry particles can be included in subsequent dielectric deposits and depress yield. The process also reveals and highlights preexisting defects such as seams and voids encapsulated in vias and trenches during earlier copper electroplating processes, or delamination of barrier/seed layers from surrounding dielectrics not easily detected in preceding operations. Particles trapped into underlying dielectrics, barrier and seed films will appear only after the metal that coats them is removed. Shifts in film microstructure through the thickness of the deposit may affect CMP rates, or lead to effects such as pull-out of grains causing pits in the surfaces or perimeters of the inlaid metal.

CMP technology including equipment, material and processes cannot meet the needs for metal thinning, planarization and defect elimination. There is no slurry meeting all the CMP requirements. Additional problems exist as to stability and shelf life of the slurry, lot-to-lot variability of certain slurry products. First-step cannot always stop at the barrier layer. Second-step polish often introduces dishing, erosion, and non-uniformity.

CMP's next challenges include:

1) Adapting to smaller device features and large wafer sizes such as 300 mm;
2) Smart processing automation such as with real-time, in-situ monitoring and feed-back control, and computerized R&D for self-optimized process control;
3) Minimizing defect formation including planarity, metal thinning, nonuniform polishing, erosion, corrosion, pits, delamination, planarization, oxide and total metal loss, scratches, ruptures, topography issues with damascene structures, excessive edge exclusion below 3 mm, too much down-force pressure during CMP especially with copper and ultralow-k dielectric materials, and other damages;
4) Minimizing copper and oxide loss in double-damascene process;
5) Tailoring and integrating equipment, material, and process to new materials such as low-k films for low cost but with minimum size and complexity, maximum productivity, endpoint control, design flexibility, improved deposition rates, versatility, reliability, and robustness; and
6) Improving slurry stability, uniformity, deterioration during processing, shelf life, and lot-to-lot variability, all customized to meet specific process needs. Special attention should be paid to possible gel formation and agglomeration of the slurries, definite knowledge of chemistry and particle interaction, time-sensitive chemicals like an oxidizer, consistent concentration of the delivered slurry, controlling particle size-distribution in mixed powders and excessive settling associated with certain particles. These improvements are necessary for rapid development, characterization, and optimization of a specific robust CMP equipment and process for each customer's product.

The CMP method of surface planarization is a dominant technology in polishing glass. It also meets planarization requirements in the <0.35 Dm (micron) feature sized multi-level devices and interconnects in the semiconductor industry. The CMP method is a preferred technology to carry out global planarization for various integrated circuits (IC). Planarized surfaces have become key to the success of advanced semiconductor devices and circuits, particularly for high-density multi-level interconnects.

In IC manufacturing, CMP involves competing requirements at various length scales, e.g., uniform removal at the wafer scale, but non-uniform removal of protruding surfaces or areas to achieve planarization at the feature scale. The process, developed so far through trial-and-error, involves a synergistic interaction of many factors: fluid flow, fluid chemistry, slurry particle material, surface dissolution, and wafer material. Ideally, the grinding and polishing method and equipment should provide: high uniformity and selectivity, low defect levels, high removal rate, low-pressure/high-speed capability, short product development time, and low cost. Also, the solid grinding/polishing abrasive materials should always remain as sharp as possible (always sharp), efficient, long-lasting, and low in initial and operating costs for rapid, reproducible grinding and polishing operations.

Grinding, polishing, or planarizing is widely used in many industries such as automotive, electronics, optical, machinery, metallurgical, medical, and glass. The quality and performance of an automobile, electronic components, optical instruments, precision machinery, glass plate, metallurgical material, or biomedical samples often critically depend on the cost and quality, e.g., flatness, surface finish, and reproducibility, of the planarized material. A perfectly planarized sample is often not available, too costly, or even impossible to obtain.

Making a modern 0.25 Dm CMOS IC chip requires 13 planarizing steps. A single major defect in any one step can result in the rejection of the entire chip lot. Even if each planarizing step has a yield of 99%, the final product yield loss from the 13 planarizing steps alone is over 12.2%. Raising yields from 99% to 99.5% in the planarizing steps still incurs a planarizing loss of 6,3%. This is still a big production and financial loss.

A planarizing machine is often used to obtain a planar, smooth outer surface on a material. The prior-art grinding or polishing machine often comprises a rotating wheel for mounting the material thereon. A colloidal liquid or liquid abrasive suspension is provided to wet the wheel and to hold/mount the material against the rotating wheel. The liquid suspension comprises a liquid suspension medium and a plurality of solid abrasive particles suspended therein. The liquid suspension is fed onto the wheel to chemically and mechanically grind or polish off surface layers of the mounted material. Both manual and automatic planarizing machines have been known in the art for quite some time.

But these machines are not satisfactory in many respects. The liquid suspension is costly but it is not reproducible; has short shelf lives; deteriorates in performance during use, transit, or even storage; and does not reliably produce quality product results. The solid abrasive particles wear out rapidly degrading the planarizing results. The solid abrasive particles also often agglomerate or break up into smaller pieces. Changes in particle size alone lead to loss of control of the desired surface finish. A large size distribution of the solid abrasive particles produces a wide variety of surface finishes of differing smoothness and qualities, hampering product yield and reproducibility.

The hard, sharp, fragile, and brittle working edges and points on the solid abrasive particles are easily damaged, producing products of variable quality even during the same planarizing run. Damaged or worn-out particles always give inferior results. The planarizing process is inefficient. The process is also costly and nonreproducible.

To overcome the foregoing and other difficulties, the general object of this invention is to protect small solid abrasive particles, delicate parts, components, jewelry, or even small instruments from damage during their preparation, use, transit, and storage;

Yet another object of the invention is to provide an improved planarizing medium that is not only highly effective but longer lasting;

It is another object of the invention to provide improved planarized surface finishes, rapidly and at low cost;

Yet another object is to provide a planarizing suspension in which the solid abrasive particles are practically forever sharp prior to use;

A further object is to greatly improve the material use efficiency f the solid abrasive particles in the planarizing operations.

Another object of the invention is to provide an improved method to minimize damage on the working quality of a planarizing medium;

Another object of the invention is to provide improved chemical mechanical polishing methods with enhanced stability, reproducibility, versatility, productivity, robustness, product qualities, and low cost;

Yet another object of the invention is to achieve minimized defects formation, lot-to-lot variability, mixed abrasive particles settling, deterioration of slurry performance with mixed solid abrasive particles;

A further object of the invention is to provide completely computer-automated self-optimizing CMP operations;

SUMMARY OF THE INVENTION

A method of improving a planarizing process comprises: providing an ever-present protective or cushioning layer all around each solid abrasive particle to prevent its direct contact with its neighbors or with another solid object. The protective or cushioning layer preserves the critical tiny, rigid, sharp but brittle working edges or points on these solid particles. This can be achieved simply by selecting a liquid suspension medium having a density nearly equal to that of the solid abrasive particles. Improved equipment and a new planarizing suspension containing the special solid abrasive particles for practicing the new planarizing method are also disclosed.

Various other objects and advantages, and a more complete understanding of the invention, will become apparent to those skilled in the art from the following description and claims, taken in conjunction with the accompanying drawings.

BRIEF DESCRIPTION OF THE DRAWINGS

To illustrate the invention, there is shown in the drawing the forms which are particularly preferred. It is understood, however, that the invention is not necessarily limited to the precise arrangements and instrumentalities here shown but, instead, may combine the same described embodiments or their equivalents in various forms.

DESCRIPTION OF THE PREFERRED EMBODIMENTS

A principal planarizing problem is the difficulty of maintaining a uniform, high-quality slurry of planarizing suspension. This suspension must be reproducible, not easily damaged and, therefore, longer lasting. A new planarizing suspension is designed to maintain the solid abrasive particles "ever-sharp" during processing, use, transit, or even storage of the" abrasive liquid suspensions.

Each of the very fine, micron or nanometer size range solid abrasive particles (typically of $Al_2O_3$) has many tiny, rigid, sharp, yet brittle working edges and points on their outer surfaces. The shape, size, perfection, and sharpness of these microscopic planarizing edges and points determine the cost, life, and performance of the planarizing liquid suspension and, in fact, the entire planarizing operation.

During their useful life, the solid abrasive particles, together with their sharp edges and points, continuously touch, contact, impact, and degrade one another. Millions of solid abrasive particles are usually carried in a limited volume amount, single slurry suspension bottle. During movement of the storage bottle or during handling of the abrasive slurry such as feeding onto the polishing wheel, many of the sharp edges and points touch one another or the container wall, sufficiently strongly relative to the thinness and brittleness of these edges and points. This contact affects the performance or quality of these solid abrasive particles.

In addition, during the use of the planarizing liquid suspension, the liquid stream containing the solid abrasive particles must be pumped or pushed around intricate pump vanes, valve seats, liquid conduits, duct walls, etc. making right, left, Y-, or U-turns while simultaneously changing in shape, size, velocity, acceleration, and direction.

In the conventional planarizing liquid slurries, the solid abrasive particles have a common average density very different from that of the liquid suspension medium. Settling and segregation due to gravity occurs. Differential accelerations, velocities, and movement due to differing densities of solid and liquid also allows neighboring solid abrasive particles pushing away the less-accelerating, intervening protective liquid suspension. The resultant direct contact between the neighboring solid particles can damage both particles precisely at the critical tiny and fragile working edges and points.

Figure 1:
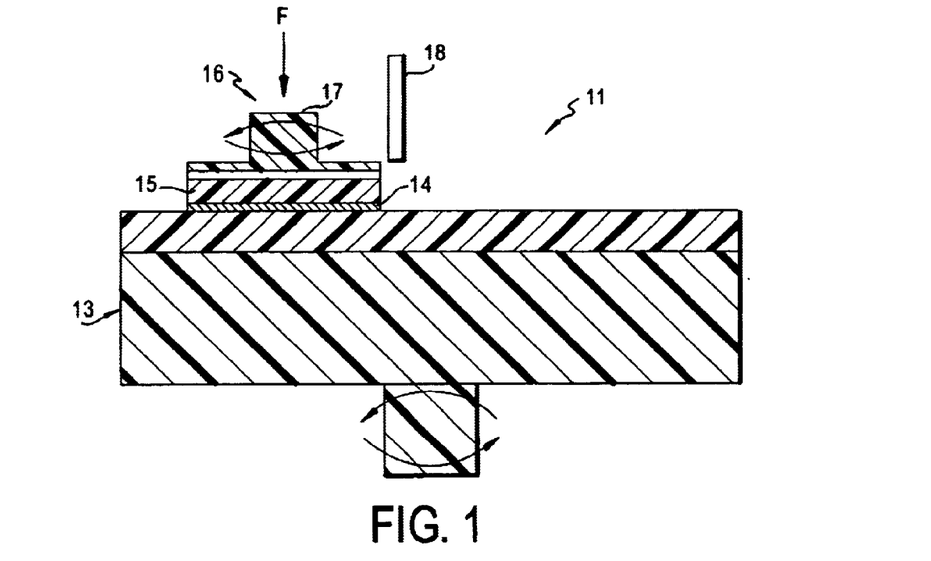
FIG. 1 shows a vertical section through a part of an improved planarizing device.

The solid abrasive particles in the liquid slurry fed vertically downward onto the polish pad (See FIG. 1) also can touch one another, possibly in mid-air but most probably when reaching the polish pad. The generally heavier solid abrasive particles, stripped bare of any slower-moving or slower-accelerating, protective liquid suspension medium, also contact one another and the polishing pad. Once on the polishing pad, the slurry droplets flatten, distort in shape, and change their movements, velocities, accelerations or decelerations relative to each other and to the lighter-density protective liquid medium between the particles. Such changes are different even in different parts of the same slurry droplet or stream. More damaging contacts between the brittle working edges and points on the solid abrasive particles again result.

The solid abrasive particles spiral out on the rotating polishing pad toward the periphery thereof. More complications again arise due to: liquid splashing, centrifugal force fields, different thicknesses or sizes of the liquid suspension film containing the gravitationally and force-segregated solid particles, and vastly greater contact area (for adhesion and friction) between the polishing pad and the suspension liquid film relative to the tiny solid abrasive particles with minimum bottom contact areas to the same pad, etc. All these complications further separate or segregate the solid abrasive particles from their protective liquid suspension films. More direct impact of the brittle solid abrasive particles and a damage of the working qualities of these particles again result.

Before reaching the material surface to be planarized, the solid abrasive particles may already be damaged or worn-out. A material use efficiency of significantly less than 100% is therefore expected with the conventional planarizing suspension. To preserve the working quality and efficiency of these liquid suspensions, attention to the millions of microscopic working edges and points on the solid abrasive particles must be made. Specifically, one can minimize the damage by the contacting or impacting neighboring particles during the entire life of these solid abrasive particles, before and after the actual CMP operation itself.

A new and successful method for this invention may be practiced by continuously protecting each of the solid abrasive particles with an inseparable, sufficiently thick, individual protective or cushioning layer of the colloidal or liquid suspension medium. To achieve this result, the solid abrasive particles must have a common density, $d_s$, which is sufficiently close to that of the suspension or colloidal liquid medium, $d_m$. The solid abrasive particles can then suspend freely and stably in the liquid medium, and are always protected and cushioned on all their outer surfaces, where the tiny fragile working edges and points are located.

For example, the liquid medium density $d_m$ may be within 2 to 15%, more preferably within 10–13% but possibly within 2–3% of the substantially constant solid density $d_s$. The solid abrasive particles are thus generally freely and stably suspended in the liquid suspension medium. Damage to the grinding and polishing qualities of the solid abrasive particles is thus minimized through reduced contacting or impacting of the solid abrasive particles on one another.

Preferably, not even a single direct contact between any two neighboring abrasive particles is allowed. During the processing, use, transit, or storage of the liquid suspension, there should be little differential movement, velocities, accelerations, or forces between any two neighboring abrasive particles, relative to one another, to the container wall of the suspension, and also to the liquid suspension medium. This is possible in this invention because the liquid suspension medium and the solid abrasive particles now nearly all have the same densities, masses per given volume, velocities, and accelerations. No direct force exchanges or momentum transfer between neighboring solid particles are possible. The brittle working edges or points are then protected.

The density of the liquid suspension medium and that of the solid abrasive particles are now nearly the same. There is no difference in movement, velocities, accelerations, and forces between the liquid suspension medium and the solid abrasive particles. Hence, the liquid suspension medium between any two neighboring solid abrasive particles, or between one abrasive particle and the nearby wall of the container, is not reduced in thickness thereby constantly providing an effective cushioning or protective layer between these two neighboring particles, between the one solid abrasive particle and the nearby wall of the container. Accordingly, the sharp and brittle working edges or points on the solid abrasive particles are also permanently protected, because of the absence of excessive contacting or, even worse, impacting movements and forces.

As a result, the abrasive liquid suspension will have a much longer life limited only by its actual use in grinding and polishing. The working qualities of the liquid suspension will be nearly the same throughout its life subject, of course, to its actual usage. Low-cost, reproducibly high-quality surface finishes of the planarized parts are then possible even for high-speed operations.

The attached figures show a planarizing machine in a sectional side view with parts removed and other parts shown somewhat schematically. The illustrated planarizer in FIG. 1 has a polishing wheel 11 rotating about a vertical axis in a counter clockwise direction. On top of the wheel 11 is a polishing pad 13 which is more fully shown in FIG. 2 as pad 13. The polishing wheel 11 and pad 13 rotate at about 30–90 rpm. On the left side of the wheel 11, there is a wafer carrier 16 which carries the silicon wafer 15 thereunder via, for instance, a double-sided adhesive tape 14. The wafer is under a downward force or pressure F (see FIG. 1) of from 2 to 9 psi, applied through the stem 17. A slurry 18 of the solid abrasive particles, typically of $Al_2O_3$, is shown feeding the suspended abrasive slurry 18 in a downward direction onto the polishing pad 13 at an off-center point. Note that the stem 17 and the wafer carrier 14 also rotate in a counter clockwise direction, though not necessarily at the same rotational speed. Additional solid abrasive particles include ceria, diamond, silica, magnesium, oxide, quartz, silicon carbide, and combinations thereof.

Changes in other slurry properties, such as pH, temperature, slurry particle composition, stream size and shape, degree of agglomeration, and slurry weight percent, also have profound effects on the polishing chemistry and material removal rates. In oxide CMP at high pH, both dissolving surface material and the slurry particles will have similar, hydrated surface layers.

Peroxide addition greatly affects the removal rate of PN barrier layer material, but only slightly on the aluminum and oxide. CMP of Cu, Ta, and TaN is often done with a slurry containing alumina particles, with the pH controlled by $NH_4OH$. The commonly used oxidizers in CMP are $H_2O_2$, $KIO_3$, $K_3Fe(CN)$ and $Fe(NO_3)_3$. The CMP action appears to be dominated by the direct abrasion of the surface film layer by the solid abrasive particles in the slurry.

An oxidizing agent is used to make copper ions on copper material. Organic acid is also used to form a chelate complex of copper in the slurry. The copper is surface oxidized by $H_2O_2$. The oxidized convex layer prevents copper from etching by a glycine/diluted $H_2O_2$ slurry, but is removed by the polishing cloth.

CMP process generally is a combined mechanical wear and chemical corrosion process for polishing. In CMP of W (tungsten) surfaces in the presence of 0.5 M $H_2SO_4$, e.g., a little wear occurs with a cathodic potential, but increases with an anodic applied potential. Copper surface CMP, under highly acidic conditions leads to severe corrosion, while under alkaline conditions the copper polishing rate selectivity with respect to $SiO_2$ is unfavorable, leading to interlevel dielectric (ILD) erosion. An intermediate pH value of 3–7 is better. Benzotriazole is often used as a corrosion inhibitor.

Many $H_2O_2$-glycine base slurries contain $SiO_2$ or $Al_2O_3$. In these slurries, the copper dissolution rate and polish rate increase with increasing glycine concentration. The dissolution/polish rate increases with increasing $Cu^{++}$ ions and levels off beyond a concentration that depends on the glycine concentration. Both of these rates decrease with increasing $H_2O_2$ concentration, presumably due to the passive CuO film formation. Thus there is dynamic balance between CuO formation and direct dissolution apart from the mechanical abrasion during the copper CMP in these slurries.

Surfactants have been added to slurries to stabilize the suspension, to improve wafer to wafer and within wafer uniformity, to decrease defects, and to enhance post-polish cleaning. All nonionic surfactants enhance stability in basic slurries, while the more soluble surfactants are effective in acidic ones. The ionic surfactants are even more effective than the nonionic surfactants at enhancing slurry stability.

Alkaline solution based on $NH_4OH$ is traditionally used in post-CMP cleaning. Tetramethyl $NH_4OH$ (TMAH) based chemicals reduce corrosion, especially at pH values higher than 10. Even in $H_2O_2$, TMAH corrodes copper at a lower rate than $NH_4OH$. The addition of a nonionic surfactant to the TMAH solution reduces copper corrosion significantly.

In oxide CMP for integrated circuits, it is critical to have a uniform post-polish thickness within and across wafers in order to minimize and maintain a low level of dishing and erosion, and to maintain the correct line resistance and interlevel or intralevel capacitance. The oxide erosion increases with high pattern density.

High-density IC areas slow down the CMP process, more than areas with isolated patterns. This is partly due to the dynamic load applied to the feature by the polishing pad. Improper CMP produces residual subsurface damage in the polished Si wafers. Such damage degrades the gate oxide integrity in metal-oxide-semiconductor devices.

Some liquid slurries contain chemicals that are stress-corrosive relative to the outer surface of the material. If the material to be planarized is steel, for example, the stress-corrosive agent may be an inorganic acid such as weak nitric or sulfuric acid. This additive material improves the planarizing speed and productivity, and even the surface finish of the planarized material.

The solid abrasive particles also have marked effects. The polish rate increases significantly only when the abrasive particle concentration exceeds a threshold value. Hence, excessive abrasive particles segregation and agglomeration are not tolerable. This threshold value correlates with the measured hardness of the thin films to be polished. The particle size critically controls the polishing rate and surface roughness during CMP of the IC interconnect. The tungsten removal rate increases with decreasing size and increasing particle concentration due to abrasive particles segregation. This suggests that the removal rate mechanism is not a scratching type process, but may be related to the contact surface area between particles and polished surface. The increasing damage measured as depth of scratches on dielectrics is a function of particle size.

Colloidal $SiO_2$ and $Al_2O_3$ particles do not change in particle sizes as a function of slurry pH, but fumed silica particles change at lower pH ranges. Increase of size in fumed silica may be attributed to agglomeration of particles. The reduced direct contacting effect between the solid abrasive particles in the present invention should minimize such agglomeration of particles.

The material removal rate in CMP operations starts slowly, rises rapidly, and levels to an equilibrium value after about 40 seconds. This is ascribed to an increased temperature due to surface change, e.g. oxidation or conversion of copper into copper oxide, and frictional heat at the polishing interfaces. The new pad design of this invention will further insure uniform and reproducible processes of the friction or oxidation and hence, the polishing operation itself.

The present method leads to savings in solid abrasive particles and a high abrasive material use efficiency compared to conventional CMP procedures. That is, the solid abrasive particles consumed in the new planarizing process are only damaged during their actual use in the very planarizing step itself, for reasons above explained.

The invented method also has better control of the abrasive particle size distribution in the planarizing operation. Without much direct contact and self-damage, much or nearly all the solid abrasive particles will retain their original sizes and shape, with reproducibly ever-sharp nascent working edges or points thereby insuring low-cost, uniform planarizing operations to achieve rapidly very fine surface finishes, run after run and part after part.

The slurry stream may be delivered with the usual liquid pressures, nozzle diameters, and spacings of the nozzle from the surface of the polishing wheel. In the new planarizing machines, the nozzle is placed close to the polishing pad 13 in FIG. 1. Specifically, the polishing pad can be within 2 to 6 inches below the nozzle tip. The polishing pad 13 also has a top portion having many laterally spaced, compartmented pockets 21. Each of these compartmented pockets stores a relatively fixed number of the nascent ever-sharp solid abrasive particles 28. Neighboring compartmented pockets 21 are separated by compartment walls 22. The compartmented pockets serve to protect the solid abrasive particles 28 contained therein from being damaged by outside objects including the slurry 18 itself and the other solid abrasive particles flying wildly around, and to keep enough of the liquid suspension medium therein to protectively cover each solid abrasive particle especially their sharp but brittle working edges or points.

The material removal rate depends on the rotational speed of the polishing pad, pressure on the pad, slurry flow rate, and other parameters. Variations in pad structure and material properties including bulk, pores, and surfaces greatly affect the CMP performance. But the reasons are not well understood. Increased pad hardness improves the control of oxide erosion.

Figure 2:
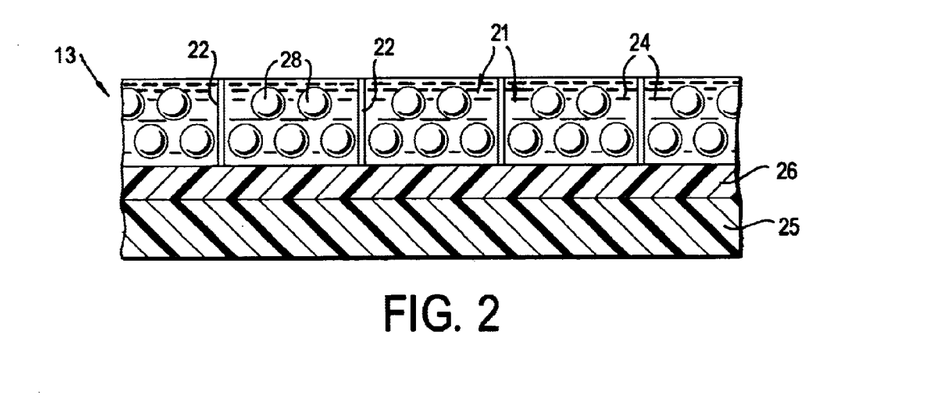
FIG. 2 is a vertical section through a part of a polishing pad on the planarizing wheel of FIG. 1 specifically showing the pad compartmented pockets containing the individualized solid abrasive particles.

As shown in FIG. 2, the top polishing pad of the invention is made of a resilient material and has its upper section 26 divided into a plurality of laterally spaced, segmented pockets 21 with open tops. Polyurethane plastics, widely used for polishing pads in the glass industry, can also be used in this invention. The colloidal liquid suspension in the slurry fills the segmented pockets and wets the rotating pad so as to hold and mount the material against the rotating pad. The generally freely and stably suspended solid abrasive particles in the liquid suspension medium have nascent, sharp but brittle working edges or points on their outer surfaces for planarizing material surfaces. Generally, these planarizing edges or points are easily damaged. In this invention, however, these same working edges or points are fully protected by the minimized direct contacting of the solid abrasive particles 28 on one another inside each segmented compartment pocket 21.

The polishing pad 13 is made of a resilient material. This material also forms the compartment walls 22 separating the neighboring compartment pockets 21. During planarizing a downward pressure F of generally 2 to 9 psi is temporarily applied through the stem 17 to the top pad material to sufficiently compress the resilient side walls 22 -between the segmented pockets 21. The downward temporary compression of the compartment walls 22 exposes the silicon wafer 15 to the rigid, sharp, but brittle edges or points on the abrasive particles 28 contained in the pockets 21. The temporarily exposed solid abrasive particles remove the wafer surface material chemically, or by mechanical action of the pressurized solid abrasive particles on the rotating wafer. Upon releasing the downward pressure, the compartment walls immediately return to better contain or protect the solid abrasive particles in the various compartmented pockets 21.

The new segmented pockets 21 have many functions: 1) minimize loss of the solid abrasive particles 28 and the intervening liquid suspension medium 24 contained in the pockets so that the particles are no longer simply lying on the rotating wheel ready for sliding or spiraling off; 2) minimize damaging contacts of the rigid, sharp but fragile working edges or points on other solid abrasive particles 28; 3) maintain uniform abrasive particle size distribution necessary for reliably uniform smooth surface finish on the planarized material; and 4) provide a cleaner working environment. The location and movement of the solid abrasive particles are highly controlled, while the liquid slurry must stay put and work with the solid abrasive particles 28 to perform the necessary CMP process.

With this new pad design, the angular velocities of the solid abrasive particles 28 and the pad are synchronized at a constant rotational speed of the polishing wheel, at different times and pad locations. The polishing actions on the wafer are uniform and reproducible.

More uniform polishing action of the invention arises for another reason. The centrifugal force and acceleration on the abrasive particle varies with the radial location on the pad, causing uneven motion of the articles on the rotating pad. A compartmented pad structure of the invention restricts the abrasive particles on the pad to be more uniformly moving or distributed.

The most important design for this new planarizing technology is to select the micron (i.e. 0.1 to 1.0 $\mu$m) or nanometer (i.e., $10^{-9}$ to $10^{-5}$ meter)size range solid abrasive particles and the liquid suspension medium to have nearly or substantially the same density. The usual solid abrasive particles are: $Al_2O_3$, $SiO_2$, ceria, SiC, diamond, MgO, and PbO having densities of 4.0. 2.65, 3.9, 3.21, 3.53, 3.65–3.97, and 9.5, respectively.

Liquid suspension media may vary in densities from less than 3 to 11 grams/cc and more, as shown below. Liquid suspension may be within 10% or 20% of the density of the above-listed or other solid abrasive particles, or even substantially the same (i.e., within 2–5% of the solid particles density). Various miscible liquids of different densities may, of course, be mixed together and fine-tuned in volume or weight proportions to get any exact required density as needed subject, of course, to constraints such as unwanted chemical reactions, environment safety, and desired use temperatures.

Useful liquid suspension media include, according to Lange's Handbook of Chemistry, J. A. Dean, McGraw Hill, New York 1992: fluorine perchlorate, density 4.95 melts at $-187.3°$ C.); HBr 3.39 (density) (melts $-97.5°$ C.); HI 5.37 ($-30.8°$ C.); $H_2Te$ 6.234 ($-49°$ C.); $IBr_2$, 4.42 ($40°$ C.); $IF_5$, 3.21 ($9.43°$ C.); $PF_3$, 3.91 ($-151°$ C.); $ReF_6$ 3.38 ($18.5°$ C.); $SbF_5$, 2.99 ($7.0°$ C.); $BiI_3$, 3.35 ($50°$ C.); $GeBr_4$, 3.13 ($26,1°$ C.); HI, 5.37 ($-50.8°$ C.); $RuO_4$, 3.29 ($25.4°$ C.); $SnBr_4$, 3.35 ($30°$ C.) soluble in hydrochloric, and acetic acid; and tribromomethane $CHBr_3$ 2.90 ($18.5°$ C.) soluble in MeOH and ethyl alcohol. Solubility data are also given above. The solubility data help in preparing the liquid suspension media; and in deciding when a given liquid suspension medium must be diluted with another solvent or when two, three or more different liquid suspension media must be used together in a mixture form to achieve a desired density. Other suitable liquid suspension media may be selected from other chemistry handbooks or reference books on organic or inorganic chemistry. Pure HBr $IBr_2$ $PF_3$ ReF6, $BF_3$, HBr, and $SnBr_4$ therefore, may be used to prepare the liquid suspension containing $Al_2O_3$ abrasive particles. These same suspension medium can also be mixed with other liquid suspension media mentioned above to achieve better or exact density matches between them and the polishing particles.

As usual, input parameters such as polishing pad design, pad type, slurry type, polishing pressure, temperature, backside pressure, and pad speed should be carefully controlled, preferably automatically through modern automation techniques for, for example, the endpoint of the CMP process. Output parameters such as material removal rate, change in removal rate time (an important indicator of solid abrasive material use efficiency), within die uniformity, within wafer uniformity, wafer to wafer uniformity, surface planarity, and planarizing defects including embedded tiny particles and scratches must also be continuously monitored and controlled. Other important performance to be monitored and controlled include: local and global uniformity, within die, within wafer, and wafer to wafer; high productivity and wafer throughout; mean time between machine failure; abrasive slurry use rate; process repeatability; and defect types and content. Non-contact electro-optical monitoring is often very useful, particularly for direct real-time inputting the monitored data into a process control computer.

The invention, as described above, is not to be construed as limited to the particular forms disclosed herein, since these are to be regarded as illustrative rather than restrictive. For example, magnesia, silicon carbide, ceria, iron or lead oxide and other solid abrasive particles of varying sizes and shapes (such as plates, cubes or ellipsoids) may be used, instead of the usual nanometer or micron size $Al_2O_3$ powders. Further, the same principle of protective or cushioning, ever-present and zero acceleration liquid suspension layer relative to the abrasive particles, can be used not just for protecting the hard, sharp, but fragile working edges or points on the solid abrasive particles, but for other articles of manufacture including knives, tool bits, jewelry, precision machine components, delicate instruments contact or impact sensitive parts, even large-size, completely assembled machineries, electronics systems, microrobotics, etc.

Figure 3:
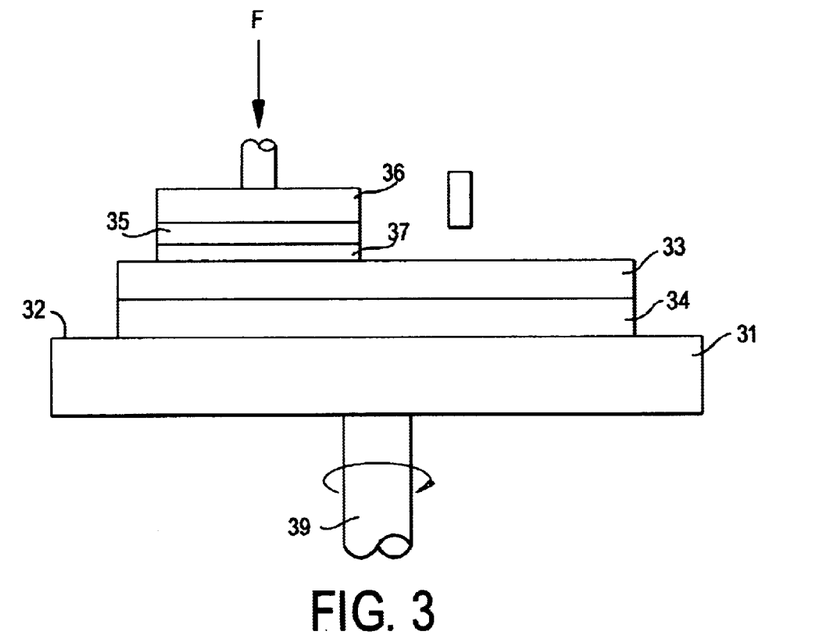
FIG. 3 is a vertical section through the silicon chip material to be polished and mounted on a rotating wheel of the CMP equipment.

FIG. 3 is a vertical section through a planarizing equipment. This equipment has a rotating polishing wheel 31 rotating about a vertical axis in the stem 39. A polishing pad or diamond-coated disk 33 is mounted on top of the wheel 31 with mechanical fastening devices such as bolts, or simply with double-sided Scotch tape 34. On the top side of the wheel 31, there is a wafer carrier 36 which carries the silicon wafer 37 thereunder via, for instance, a double-sided adhesive tape 35. The major surface of the wafer 37 to be polished must, of course, be downward and face the top surface of the rotating polishing disk 33. The wafer is under a downward force or pressure against the top surface 32. A liquid stream 38 is fed onto the polishing pad or diamond disk 33. If the polishing wheel is diamond-coated on its top, the liquid stream 38 may simply be water to remove the polishing debris. Otherwise, a chemical etchant is added to the water to also achieve chemical-mechanical polishing. If the polishing wheel has a flat rubber-coated top surface with no abrasive action, the liquid stream 38 may be a suitable liquid suspension medium carrying the solid abrasive particles of this invention to effect CMP processing.

Figure 4:
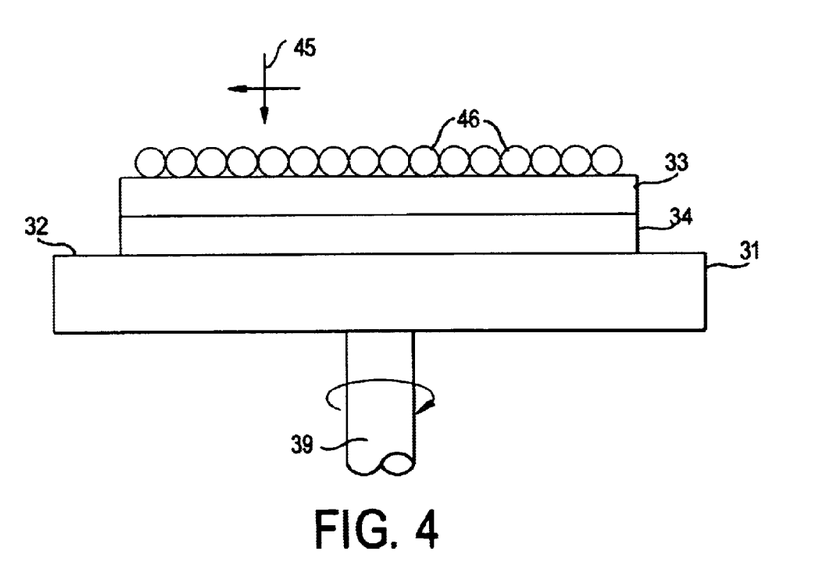
FIG. 4 shows a vertical section of a diamond coating machine for a single or multiple vertically oriented, laterally moving laser beams used in the fusion bonding of the diamond abrasive particles onto the top surface of the CMP rotating wheel.

FIG. 4 shows a vertical section of a diamond coating machine to produce the diamond-coated polishing disc 33. The polishing disc 33 to be diamond-coated may be placed on a stationary horizontal surface or attached to the top surface 32 of the rotating wheel 31 with attaching means such as the double-sided Scotch tape 34. A single or multiple vertically oriented, laterally moving laser beams 45 are used in the fusion bonding of the diamond abrasive particles 46 onto the top surface of the polishing disc 33, using a diamond coating method described elsewhere. The preferably computer-controlled lateral movement of the laser beam or beams, particularly when used in combination with the rotating polishing wheel 31, are designed to insure uniformity of the diamond particles coating on the polishing discs 33.

A simpler rotary, orbital, or linear CMP platform without the use of any liquid polishing slurry containing abrasive particles is possible with a diamond coated alumina, silicon nitride, or other ceramic platform substrates. Ceramic is used for their hardness, rigidity, and light density, and also for fast accelerations and speed controls. The use of ceramic platform will minimize much of the conventional CMP problems such as planarity, metal thinning, nonuniform polishing, erosion, corrosion, pits, delamination, planarization, oxide and total metal loss, scratches, ruptures, topography issues with damascene structures, excessive edge exclusion below 3 mm, too much down-force pressure during CMP especially with copper and ultralow-k dielectric materials, and other damages. There need then no more slurry, chemistry-particle interaction, gel formation and agglomeration of particles. In addition, the equipment is simpler, cleaner, easier to design, and lower in cost.

In particular, a ceramic CMP platform substrate coated with diamond particles is often recommendable. Diamond polishing disks are extremely hard, rigid, light, chemically inert, very fast rotating or accelerating, long-lasting in sharpness and performance, and provides uniform, reproducible planarity, metrology, submicron surface finishes regardless of the their hardness, porosity, and other properties of the barrier, metal, and dielectric materials.

Li's U.S. Ceramic coating application Ser. No. 08/482, 199, filed Jun. 8, 1996 contains disclosures of coating diamond particles on ceramic or metal substrates. Li's patent No. 5,874,175 on Ceramic Composite discloses specific techniques for bonding ceramics, including diamond, to unmatched metals or ceramics. The unique features of Li's ceramic bonding and coating methods include:

1) high-temperature brazing method involving liquid fusion. Liquid fusion methods gives liquid diffusion rates which are generally over ten Orders of magnitude faster than solid diffusion rates in the above cited methods. Hence, the diffusion length is also several orders of magnitude longer than the solid diffusion lengths achieved in other high or low-temperature particles bonding or coating methods, whether physical, chemical, or metallurgical. That is, the bonding interfaces in these new diamond disks are composition graded reducing the mismatch stress gradients;

2) The bonding interfacial regions are mechanically perfect and contain no voids, microcracks, or other defects visible at 1,000×magnifications. This is shown in the microphoto in Li's "Diamond Metallization" paper given at the end of this specification;

3) The special metallizing liquid formed during ceramic metallizing is highly wettable to the ceramic with wetting angles of less than 5° or even down to 0°. The metallizing liquid has such compositions that wet and form with the ceramic strengthening reinforcement at defect regions on the ceramic surface. In particular, the ceramic surface defects (such as voids, microcracks, grain or subgrain boundaries) are thus converted from crack-initiating regions into reinforced regions. The bonded or coated ceramic surface regions are therefore stronger than the brittle ceramic themselves;

4) Methods have been developed so that even highly unmatched metal-ceramic bonds or coatings can be made to large sizes (i.e., 3/8"×3/8"×1/2"). These large-size mismatched joints or coating can repeatedly withstand high temperatures or thermal shocks up to 1,000° C.; and 5) An excellent bonding technique for diamond, carbon, and graphite is to use a carbide-forming metallizing metal such as Fe, Au, B, Co, Cr, Ir, Nb, Ni, Os, Pd, Pt, Re, Rh, Ru, Si, Ta, Th, Ti, U, V, W, and Zr. A carbide eutectic is formed which melts at much lower temperature than the melting point of carbon or diamond of over 3,200° C.;

The strength and heat resistance of these microscopically (down to microns) defect-free bonds and coating are exemplified as follows: alumina-carbon steel joints can withstand 1,000° C., while diamond and silicon carbide bonds can withstand 900° C. In preparing for microsections, cutting even a 1.5 mm diamond grain bonded onto carbon steel represents great difficulties. It generally required three diamond cutting wheels rotating at 2,000 rpm for three days. Instead of the diamond wheel cutting the small brazed-on diamond grain, the single brazed-on diamond grain is actually cutting the millions of diamond powders bonded by other methods on the diamond cutting wheels, while sustaining 8.6 millions severe mechanical shocks. This is also reported in Li's "Diamond Metallization" paper mentioned elsewhere. Successful ceramic metallizing and bonding results showing mechanically perfect, highly mismatched ceramic-metal joints, which can withstand repeated thermal quenches from 900 to 1,000° C. to ice water, are also described in Li's patents referred to at the end of the specification.

The new bonded diamond grains or coated layers thus form excellent machining tools for grinding and polishing. In particular, braze-bonded diamond wheel forms excellent CMP platforms because of the many unique properties of diamond. These tools are high-fidelity tools because of the extreme hardness of diamond, the microscopically defect-free bonding, and strengthening of the bonded interfacial regions which are even stronger than diamond itself, as indicated above.

Diamond oxidizes at high temperature, forming CO and $CO_2$. Diamond also is unstable at temperatures above about 1,050° C., changing phase from crystalline to graphite. A new diamond bonding or coating method is therefore given as follows, This method takes advantage of the transparency of diamond. In this new method, micron size or submicron-size diamond particles are laid onto a substrate of steel or ceramic such as alumina or silicon nitride. Laser beams are then used to enter the transparent diamond particles through the sharp, rigid and brittle top working surface of the diamond particles, without much energy exchange and heating from the injecting photons to the diamond. The laser-opaque bottom of each diamond particle contacting the substrate receive most, if not all, the laser energy. At the contacting or bonding diamond-substrate interface, heating, carbide eutectic formation, liquid diffusion, fusion bonding, liquid penetration and surface strengthening all take place. But otherwise the top working edges of the diamond grains are unaffected as to composition, material phase (hard diamond and not soft graphite), and grinding and polishing qualities. Selected pulse laser heating also provides precise heating. Laser heating can also be pulsed so fast that only air ambient, not vacuum, hydrogen or other reducing environment, is necessary for the diamond bonding or coating process, without risk of diamond oxidation or phase change into soft graphite.

In Li's ceramic metallizing/brazing process, the ceramic particles are fusion brazed onto a metallic or ceramic substrate at high temperature (900–1400° C.) with a liquid ceramic metallizing/brazing alloy acting as a liquid suspension medium for the ceramic (abrasive) particles. The ceramic abrasive particles may be alumina, ceria, diamond, silicon carbide, magnesium oxide, lead oxide, quartz, or combination thereof. After the ceramic particles are suspended in the liquid metallizing/brazing alloy at the high metallizing/brazing temperature, they react with the alloy and the substrate to form a fusion-formed braze layer. Upon cooling, the solid brazed ceramic layer bonds the brazed ceramic particles onto the substrate.

At the brazing temperature the ceramic metallizing/brazing alloy is liquid. By design, this liquid can be highly wettable to the ceramic particles, to thereby wet and fill defects in the ceramic surface layer. Upon cooling, these wetted and filled defects are converted from crack-initiating, surface defects into surface-reinforced regions. The reinforced ceramic is often stronger than the ceramic particles themselves. This metallizing process applies to diamond and other ceramic particles, forming braze-formed, mechanically perfect and metallurgically continuous, interfacial regions which are free of voids and microcracks visible at 1,000 times magnification.

Because CMP is an extremely complex process involving many phenomena, materials, processing steps, and equipment variables comprehensive experimentation has not been conducted, and thus there are no guidlines for the optimization of the design and operating conditions for CMP. Any optimum CMP operation depends on many variables, some but not all of which are mentioned above, and must require complete computerized automatic experimentation.

Accordingly, it is recommended that Li's method for Automatic Development of Computer Software, U.S. Pat. No. 6,144,954, be applied to the CMP equipment. Specifically, the improved CMP equipment is provided with: a) sensing means for sensing in real-time the progress of the CMP operation particularly the end point; b) computer means for computerized automatic research and development on said CMP process; c) feed-back means for close-loop feed back control; d) means for automatically determining in real time an optimum processing CMP procedure, and e) means for automatically generating required computer software for the CMP operation, with the computer real-time optimized CMP operating procedures. All these steps are by a computer with little or no human control, supervision, and guidance. Humans are too slow, biased, and unreliable to handle modern complex processes and equipment.

The slurry may contain only one type of solid abrasive particles. In this case, it is highly desirable to have these particles suspending in an nearly equal-density liquid suspension medium. A plurality of solid abrasive particles may also be used in the same CMP slurry Two solid abrasive particles with differing densities, such as alumina and ceria with densities of 4.00 and 3.90 respectively, are often used to grind and polish a substrate silicon. Li in his 5,874,175 patent (at column 6, lines 33–54 and column 7, lines 28–36) gives, for a given solid suspended solid particles, its unique velocity constant. This velocity constant characterizes the settling behavior of the particles in a fluid suspension medium, and is given by the following equation: A solid particle of size or diameter s and density d suspended in a liquid suspension medium of density $d_m$ and viscosity n has a velocity constant as follows:

$$v=(d-d_m)g/18n$$

where g is the gravitational constant, and d the density $d_1$ or $d_2$ of the solid particles suspended in a liquid suspension medium of density $d_m$ and viscosity n.

One can thus calculate the velocity constants and the settling behavior in water at 20° C. ($d_m$=1.0 and n=0.010) of various solid Spherical particles, with densities in g/cc:

$$v=5,440\times(d_1-1)$$

For example, mixed solid alumina (density 4.00, size $d_1$) and ceria (density 3.90 and size $d_2$) particles suspended in a water suspension (density about 1 and viscosity for CMP of silicon wafers. The velocity constants calculated according to the above equation are 16,300 and 15,800, for alumina and ceria spherical particles respectively. If we mix the alumina and ceria powders in the size (diameter D) ratio of the square root of the velocity constant ratio (16,300/15,800=1.03), i.e., 1.02, the final settling velocities of both these size-ratioed powders will be exactly the same.

Because the velocity constant ratio of alumina and ceria abrasive particles in a water slurry at 20° C. is very close to one, i.e., 1.03, one can use equal-sized alumina and ceria abrasive particles and still get the same final settling velocities differing by only 1.7% from each other.

That is, by simply making the alumina powders 1.7% larger than the ceria powders, the mixed particles will finally settle in water at 20° C. at exactly the same velocity. Gravitational segregation of these two particles is then totally eliminated during the final stages of mixed-powder coating or applying process. This condition leads to uniformity in the CMP results due to the uniform composition of the finally deposited layers of the mixed alumina and ceria. Global planarity and CMP uniformity is then facilitated.

Three of more mixed powders can, in a similar manner, also be made to size-ratio with respect to their densities so that they all finally settle out at the same velocity.

For the same reason, one can even use a single $PF_3$ liquid suspension medium having a density of $d_m=3.91$, a melting point of −151° C., and a boiling point of −105° C., as shown above. In this case, the ceria particles have a density $d_1=3.90$ which is only −0.256% less than the liquid suspension medium density dm=3.91, while the alumina particles have a density of $d_1=4.00$ which is only +2.56% greater than that of the same liquid suspension medium. Using 1% smaller alumina particles than ceria particles will further slightly improve the gravitational settling and segregation results.

Also, liquid suspension media of $SbF_5$, with density 2.99 (and melting point 7.0° C.); $BiI_3$, 3.35 (50° C.); $GeBr_4$, 3.13 (26,1° C.); HI, 5.37 (−50.8° C.); $RuO_4$, 3.29 (25.4° C.); and $SnBr_4$, 3.35 (30° C.) can also be used, singly or in combination with each other or with other density-adjusting liquids, to have nearly the same density as the suspending solid abrasive particles. In these liquid suspensions, the solid abrasive particles will stably and uniformly suspend in the suspension liquids.

Accordingly, the invention is to be limited only as indicated by the scope of the appended claims.

The following applications and patents are incorporated into this application for CMP method:

1. U.S. patent application Ser. No. 08/482,199, filed Jun. 8, 1996 containing disclosures of coating diamond particles on ceramic or metal substrates;

2. U.S. Pat. No. 5,874,175 on "Ceramic Composite", Ser. No. 301,582, disclosing techniques for bonding ceramics, including diamond, to unmatched metals or ceramics;

3. U.S. Pat. No. 6,286,206 on "Heat-resistant Electronic Systems and Circuit Boards", Ser. No. 09/053,741;

4. U.S. Pat. No. 6,144,954 on "Automatic Development of Computer Software", Ser. No. 014,437; and 5. C. H. Li, "Diamond Metallization", in Diamond Material, Proc. 93–17, 1993 Electrochemical Soc. Eds. J. Kismukes & K V Ravi, pp 605–612.

What is claimed is:

1. CMP equipment of the type having a platform moving relative to a material to be polished;
   said platform comprising a platform substrate;
   solid abrasive particles introduced onto said substrate; and
   means for preventing tiny, hard but brittle working edges and points on said solid abrasive particles from sufficiently contacting and damaging each other to thereby significantly lengthen the useful life of the of said solid abrasive particles.

2. The CMP equipment as in claim 1 in which said solid abrasive particles are supplied as a fluid slurry consisting of a fluid suspension medium and a plurality of said solid abrasive particles suspended in said fluid suspension medium.

3. The CMP equipment as in claim 2 in which said fluid suspension medium is a liquid suspension medium; and said solid abrasive particles and said liquid suspension medium differ in densities by no more than a figure selected from the group consisting of 15%, 10%, 5%, and 2%.

4. The CMP equipment as in claim 3 in which said liquid suspension medium and said solid abrasive particles have nearly the same density.

5. The CMP equipment as in claim 4 in which said liquid suspension medium is selected form the group consisting of an aqueous and nonaqueous material.

6. The CMP equipment as in claim 1 in which said platform substrate is selected from the group consisting of Mo, Ni, Si, Fe, W, SiC, diamond, silicon nitride, boron nitride, and ceramic superconductor, and mixtures thereof.

7. The CMP equipment as in claim 1 in which said solid abrasive particles are ceramic particles selected from the group consisting of alumina, ceria, diamond, silicon carbide, magnesium oxide, lead oxide, quartz, and combination thereof.

8. Equipment for handling a plurality of delicate solid objects, comprising:
   a common liquid container;
   a liquid suspension medium contained in said common liquid container;
   a plurality of delicate solid objects suspended in said liquid suspension medium contained in said common liquid container; and
   means for preventing the plurality of said delicate solid objects in said liquid suspension medium contained in said common liquid container from sufficiently contacting and damaging each other to thereby significantly preserve at least a desired quality of the plurality of said delicate solid objects.

9. The equipment as in claim 8 in which said delicate solid objects are selected from the group consisting of solid abrasive particles, knives, tool bits, jewelry, watches, delicate parts and components, fragile materials, and solid objects with delicate surface features to be protected and preserved.

10. A planarizing equipment for planarizing an outer surface of a material comprising:
   a planarizing platform relatively moving with respect to said material to be planarized;
   mean for holding and mounting the material against the relatively moving platform with the outer surface of the material facing against a surface of said moving platform;
   a liquid suspension supplied between said material and said relatively moving platform;
   said liquid suspension comprising a liquid suspension medium of a specific liquid density and a plurality of solid abrasive particles of a substantially constant solid density, for planarizing the outer surface of the material;
   the specific liquid density being selected to be sufficiently within 15% of the substantially constant solid density whereby at least a majority of the plurality of said solid abrasive particles are freely and stably suspended in the liquid suspension medium without gravitational settling and separation thereby minimizing damaging contact of the solid abrasive particles and prolonging life of said abrasive liquid suspension.

11. CMP equipment of the type having a platform moving relative to a material to be polished;

said platform comprising a platform substrate;

solid abrasive particles introduced onto said substrate as a fluid slurry consisting of a fluid suspension medium and a plurality of said solid abrasive particles suspended in said fluid suspension medium; and means for preventing tiny, hard but brittle working edges and points on said solid abrasive particles from sufficiently contacting and damaging each other to thereby significantly lengthen the useful life of the solid abrasive particles;

wherein said solid abrasive particles are mixed powders of two different materials having different densities and are supplied in the form of a fluid slurry consisting of a fluid suspension medium and a plurality of said solid abrasive particles suspended in said fluid suspension medium; and in which differences in settling velocities in the fluid suspension medium of said mixed powders are minimized by ensuring that denser powder particles have smaller diameters relative to the diameters of powder particles that are less dense.

12. CMP equipment of the type having a platform moving relative to a material to be polished;

said platform comprising a platform substrate;

solid abrasive particles introduced onto said substrate as a fluid slurry consisting of a fluid suspension medium that is a liquid suspension medium and a plurality of said solid abrasive particles suspended in said fluid suspension medium, said solid abrasive particles and said liquid suspension medium differ in densities by no more than a figure selected from the group consisting of 15%, 10%, 5%, and 2%; and means for preventing tiny, hard but brittle working edges and points on said solid abrasive particles from sufficiently contacting and damaging each other to thereby significantly lengthen the useful life of the solid abrasive particles;

wherein said solid abrasive particles are mixed powders of a plurality of different types having different densities and sizes there between, to be applied as a coated layer of said mixed solid particles having different average densities and sizes and suspended in said common fluid suspension medium; and said mixed solid particles having the different average densities and sizes being in a calculated size ratio to equalize average settling velocities of said mixed solid particles in said common fluid suspension medium at least in a preselected time period of the applying process.

13. Equipment for handling a plurality of delicate solid objects comprising:

(a) a liquid container having a bottom and enclosing side wall means, said liquid container bottom having a top major surface;

(b) a liquid suspension medium placed on said top major surface inside said liquid container;

(c) a plurality of delicate solid objects suspended in said liquid suspension medium contained in said liquid container; and (d) means for preventing the plurality of said delicate solid objects in said liquid suspension medium contained in said liquid container from sufficiently contacting and damaging each other to thereby significantly preserve at least a desired quality of the plurality of said delicate objects.

14. The equipment according to claim 13 in which said delicate solid objects are selected from the group consisting of solid abrasive particles, knives, tool bits, jewelry, watches, delicate parts, sensitive components, fragile materials, solid object with delicate features to be protected and preserved.

15. An equipment for planarizing an outer surface of a material comprising:

(a) a source of a fluid carrier medium;

(b) a supply of solid abrasive particles suspended in a fluid carrier medium to form a fluid suspension, said solid abrasive particles having on their outer surfaces tiny, hard but brittle working edges and points capable of planarizing an outer surface of a material;

(c) means for applying said fluid suspension onto the outer surface of said material;

(d) means for preventing said tiny, hard but brittle working edges and points on said solid abrasive particles in said fluid suspension from sufficiently contacting and damaging each other to thereby significantly lengthen the useful life of said solid abrasive particles.

16. The equipment as in claim 14 in which said preventing means comprises means for causing said solid abrasive particles to have nearly the same density as the fluid carrier medium whereby the solid abrasive particles freely and stably suspend in the fluid suspension without any tendency to go either up or down therein.

17. The equipment as in claim 16 in which said fluid suspension comprises a liquid suspension medium and a plurality of solid abrasive particles suspended therein; and a changing means comprising a means for changing the density of at least one of said liquid carrier medium and said solid abrasive particles.

18. The equipment as in claim 17 in which said changing means comprises means for providing on each of said solid abrasive particles an ever-present cushioning liquid film of a substantially constant thickness.

19. The equipment as in claim 17 in which said changing means comprises means for minimizing gravitational setting and segregation of the solid abrasive particles in the fluid suspension.

20. The equipment as in claim 17 in which said fluid suspension is selected from the group consisting of stationary liquid suspension and moving liquid suspension stream.

21. The equipment as in claim 17 in which said fluid suspension is a moving liquid suspension stream; and during said planarizing operation said liquid suspension stream changes at least one feature selected from the group consisting of shape, size, velocity, acceleration, and direction.

22. The equipment as in claim 21 in which said moving liquid suspension stream moves in a curved path generating, at a fixed location inside said liquid suspension stream, a substantially constant centrifugal acceleration on both said liquid suspension medium and said solid abrasive wherein said solid abrasive particles and the liquid suspension medium have nearly the same density.

23. The equipment as in claim 16 in which said abrasive particles are selected from the group consisting of $Al_2O_3$, $SiC_2$, Ceria, SiC, diamond, MgO, and PbO.

24. The equipment as in claim 16 in which said fluid suspension is a moving liquid suspension stream; and during said planarizing operation said moving liquid suspension stream changes at least one feature selected from the group consisting of shape, size, velocity, acceleration, and direction.

25. The equipment as in claim 16 in which said fluid suspension has a density differing from that of said abrasive particles by no more than a value selected from the group consisting of 2% 5%, 10%, AND 15%.

* * * * *